United States Patent
Yuan et al.

(10) Patent No.: US 7,075,205 B2
(45) Date of Patent: Jul. 11, 2006

(54) ROTOR AND STATOR STRUCTURE OF MOTOR

(75) Inventors: Qiong Yuan, Taoyuan Shien (TW); Wan-Bing Jin, Taoyuan Shien (TW); Zhi-Gan Wu, Taoyuan Shien (TW); Jian-Ping Ying, Taoyuan Shien (TW); Shih-Min Huang, Taoyuan Shien (TW); Wen-His Huang, Taoyuan Shien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/839,262

(22) Filed: May 6, 2004

(65) Prior Publication Data

US 2005/0248227 A1 Nov. 10, 2005

(51) Int. Cl.
*H02K 21/12* (2006.01)
(52) U.S. Cl. .................. 310/156.43; 310/259; 310/269
(58) Field of Classification Search .............................. 310/156.01–156.84, 49 R, 254, 257–258, 310/269
See application file for complete search history.

(56) References Cited

U.S. PATENT DOCUMENTS

| 3,495,107 A | * | 2/1970 | Haydon ..................... 310/49 R |
| 4,987,331 A | | 1/1991 | Horng ......................... 310/254 |
| 6,717,323 B1 | * | 4/2004 | Soghomonian et al. ..... 310/254 |

* cited by examiner

*Primary Examiner*—Thanh Lam
(74) *Attorney, Agent, or Firm*—Arent Fox PLLC

(57) ABSTRACT

An rotor and stator structure of a motor is provided. The rotor structure includes a rotation axis and a magnet encircling the rotation axis. The magnet is magnetized radially or axially. The stator structure includes a sleeve, a first ring positioned on one opening of the sleeve, and a second ring positioned on the other opening of the sleeve. N pieces of first salients and N pieces of second salients are spacedly and coplanarly extended from the first ring and the second ring respectively, and the position of each piece of the first salients corresponds to that of each piece of the second salients.

14 Claims, 11 Drawing Sheets

ROTOR AND STATOR STRUCTURE OF MOTOR

FIELD OF THE INVENTION

The present invention relates to the rotor and stator structure of a motor, and more specifically to the rotor and stator structure of a non-brush D.C. motor, which has a particular structure for improving the efficiency thereof.

BACKGROUND OF THE INVENTION

A conventional non-brush D.C. motor includes a stator having a plurality of poles, and a housing receiving hole at its center. Each pole is shaped as a T character and a group of coils is wound around every arm of the poles. The costs for the stator and the wound coils are very expensive.

According to the prior art of U.S. Pat. No. 4,987,331, another conventional non-brush D.C. motor is provided. The non-brush D.C. motor with an improved stator is constituted by a base made of plastic materials, a coil winding around the base, two sets of magnetic polar plates each set of which forming a pair of magnetic poles fixed at both sides of the base, and a circuit board connected to one side of the base. The two sets of polar plates are staggered each other. For the stator with this staggered structure, the magnet of the rotor must correspondingly be a strip which is magnetized radially and has the N and S polarities arranged spacedly.

The structure of the above improved motor is quite different from the common motors. The rotor is a magnet of a strip which is magnetized radially and has the N and S polarities arranged spacedly. The bobbin within the coil and the polar plates magnetically connected to a metal bushing constitutes the improved stator. The two polar plates form a staggered position with each other by one pole. The upper polar plate is piled by multiple layers of silicon steel, and the lower polar plate is also piled by the same layers of silicon steel. When the coil is excited to generate magnetic field, with the help of the magnetic polar plates the metal bushing generates magnetic field so that the shaft of the rotor can be rotated.

For the two sets of magnetic polar plates, each set has a pair of the magnetic poles. However, this structure leads to a larger size of the stator structure. Besides, the two set of the magnetic polar plates which are staggered each other lower the efficiency of the motor.

Accordingly, it is necessary to provide a more compact and stable rotor and stator structure for improving the efficiency of the motor.

SUMMARY OF THE INVENTION

It is the main object of the present invention to provide a new rotor and stator structure for improving the efficiency of a non-brush D.C. motor.

It is another object of the present invention to provide a motor which has a more compact structure than the prior art.

According to the main object of the present invention, the rotor structure includes a housing having a rotation axis and a side wall encircling and parallel to the rotation axis; and a magnet encircling the rotation axis and contacted with the side wall, wherein the magnet is magnetized radially.

Preferably, the housing is made of a magnetically conductive material.

Preferably, the magnet includes two parts separated by a plane perpendicular to the rotation axis, each part includes a plurality of corresponding magnetic areas, and each the magnetic area has a polarity opposite to that of an adjacent one.

Preferably, the number of the magnetic areas of each part of the magnet is 2N, and N is an integer greater than 1.

Preferably, the magnetic areas which are vertically corresponding to each other have opposite polarities.

According to the main object of the present invention, the rotor structure includes a housing having a rotation axis and a side wall encircling and parallel to the rotation axis; and a magnet encircling the rotation axis and contacted with the side wall, wherein the magnet is magnetized axially.

Preferably, the housing is made of a non-magnetized conductive material.

Preferably, the magnet includes a plurality of corresponding axial magnetic areas, and one end of each the magnetic area has a polarity opposite to that of another end of the magnetic area.

Preferably, the number of the magnetic areas is 2N, and N is an integer greater than 1.

Preferably, each end of the magnetic areas have a polarity opposite to that of a corresponding end of an adjacent one.

According to the main object of the present invention, the stator structure includes a sleeve; a first ring positioned on one opening of the sleeve and having N pieces of first salients spacedly and coplanarly extended from the first ring; and a second ring positioned on the other opening of the sleeve and having N pieces of second salients spacedly and coplanarly extended from the second ring; wherein the position of each piece of the first salients corresponds to that of each piece of the second salients, and N is an integer greater than 1.

Preferably, the sleeve is made of a magnetically conductive material.

Preferably, the first salients and the second salients are cranked toward the same direction.

Preferably, the first ring and the first salients serve as an upper polar plate, the second ring and the second salients serve as an lower polar plate, and the upper polar plate and the lower polar plate are both made of M layers of silicon steel, wherein M is a nature integral.

Preferably, the stator structure is integrally formed by a magnetically conductive material.

Preferably, the magnetically conductive material is silicon steel.

According to another object of the present invention, the motor includes a rotor structure including a rotation axis and a magnet encircling the rotation axis, wherein the magnet includes two parts separated by a plane perpendicular to the rotation axis, each part includes 2N corresponding magnetic areas, each the magnetic area has a polarity opposite to that of an adjacent one, and the magnetic areas which are vertically corresponding to each other have opposite polarities; a stator structure including a sleeve, a first ring positioned on one opening of the sleeve, and a second ring positioned on the other opening of the sleeve, wherein N pieces of first salients and N pieces of second salients are spacedly and coplanarly extended from the first ring and the second ring respectively, and the position of each piece of the first salients corresponds to that of each piece of the second salients; and a coil wound around the sleeve; wherein when the stator structure is energized through electrifying the coil, each piece of the first salient is induced to have a polarity opposite to each corresponding piece of the second salient, so that the rotor structure rotates around the rotation axis, and N is an integer greater than 1.

Preferably, the sleeve is made of a magnetically conductive material.

Preferably, the first salients and the second salients are cranked toward the same direction.

Preferably, the first ring and the first salients serve as an upper polar plate, the second ring and the second salients serve as an lower polar plate, and the upper polar plate and the lower polar plate are both made of M layers of silicon steel, wherein M is a nature integral.

Preferably, the stator structure is integrally formed by a magnetically conductive material.

Preferably, the magnetically conductive material is silicon steel.

According to another object of the present invention, the motor includes a rotor structure including a rotation axis and a magnet encircling the rotation axis, wherein the magnet includes 2N corresponding axial magnetic areas, one end of each the magnetic area has a polarity opposite to that of another end of the magnetic area, and each end of the magnetic areas have a polarity opposite to that of a corresponding end of an adjacent one; a stator structure including a sleeve, a first ring positioned on one opening of the sleeve, and a second ring positioned on the other opening of the sleeve, wherein N pieces of first salients and N pieces of second salients are spacedly and coplanarly extended from the first ring and the second ring respectively, and the position of each piece of the first salients corresponds to that of each piece of the second salients; and a coil wound around the sleeve; wherein when the stator structure is energized through electrifying the coil, each piece of the first salient is induced to have a polarity opposite to each corresponding piece of the second salient, so that the rotor structure rotates around the rotation axis, and N is an integer greater than 1.

Preferably, the sleeve is made of a magnetically conductive material.

Preferably, the first salients and the second salients are cranked toward the same direction.

Preferably, the first ring and the first salients serve as an upper polar plate, the second ring and the second salients serve as an lower polar plate, and the upper polar plate and the lower polar plate are both made of M layers of silicon steel, wherein M is a nature integral.

Preferably, the stator structure is integrally formed by a magnetically conductive material.

Preferably, the magnetically conductive material is silicon steel.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
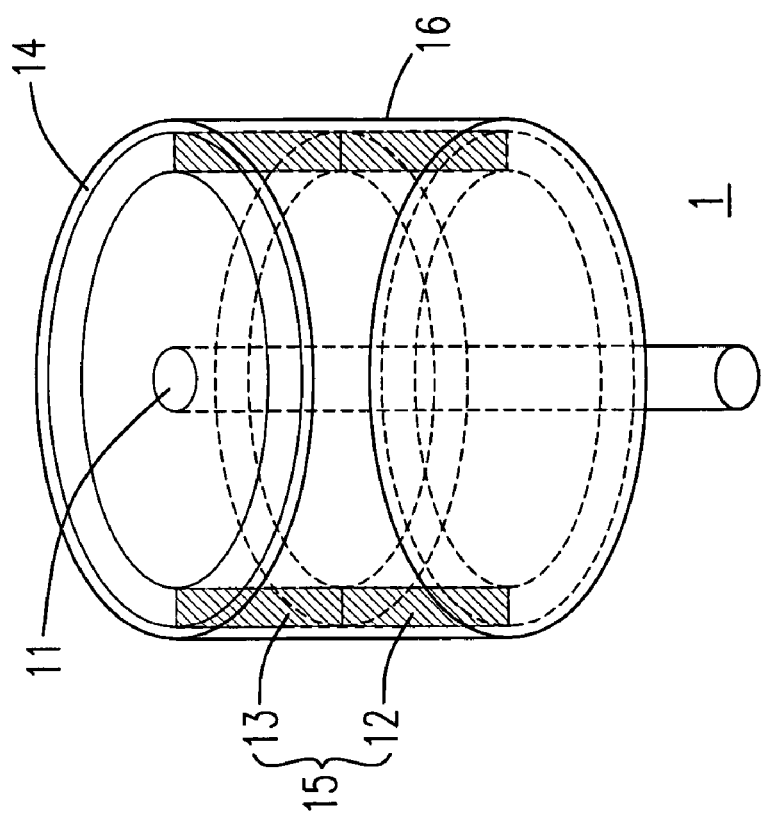
FIG. 1(a) is a diagram showing the rotor structure of the non-brush D.C. motor in accordance with a preferred embodiment of the present invention.

Please refer to FIG. 1(a), which is a diagram showing the rotor structure of the non-brush D.C. motor in accordance with a preferred embodiment of the present invention. The rotor structure 1 includes a housing 14, a magnet 15, and a rotation axis 11. The housing 14 has a side wall 16 encircling and parallel to the rotation axis 11. The magnet 15 encircles the rotation axis 11 and is connected to the side wall 16.

Figure 1B:
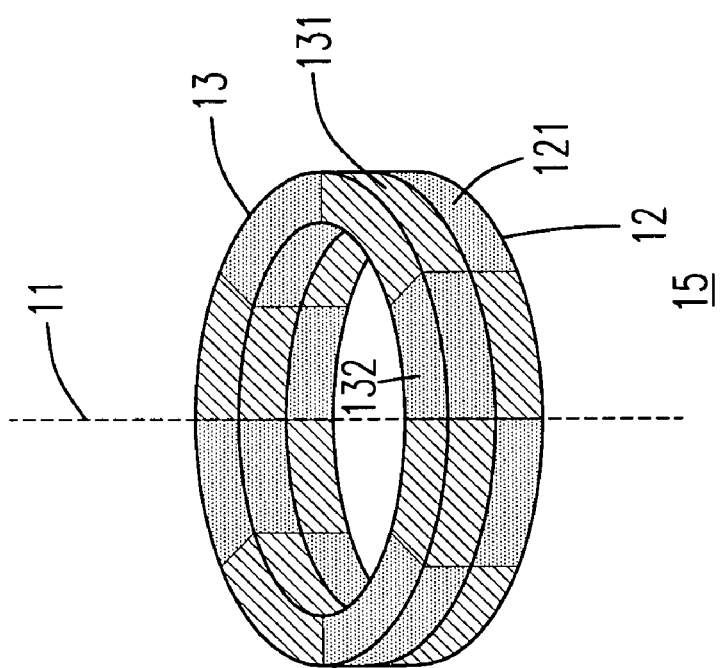
FIG. 1(b) is the side view of the radially magnetized magnet in accordance with the present invention.

Please refer to FIG. 1(b), which is the side view of the magnet 15 according to FIG. 1(a). The magnet 15 is radially magnetized. The magnet 15 can be separated into an upper magnetic strip 13 and a lower magnetic strip 12 by a plane perpendicular to the rotation axis 11. Both the upper magnetic strip 13 and the lower magnetic strip 12 respectively include 8 corresponding magnetic areas. Each magnetic area has a polarity opposite to that of an adjacent one, and the magnetic areas which are vertically corresponding to each other have opposite polarities. For example, as FIG. 1(b) shows, the polarity of the magnetic area 131 has a polarity opposite to that of the magnetic areas 132 and 121. That is, if the polarity of the magnetic area 131 is N, the polarities of the magnetic areas 132 and 121 are S.

Figure 1C:
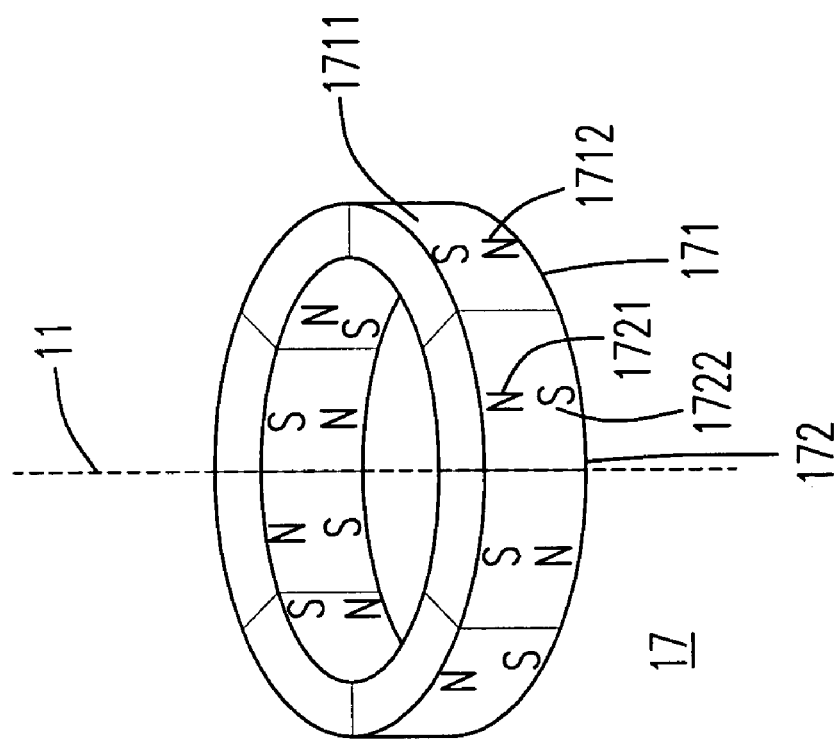
FIG. 1(c) is the side view of the axially magnetized magnet in accordance with the present invention.

Please refer to FIG. 1(c), which is another kind of the side view of the magnet in accordance with the present invention. Besides of the arrangement of FIG. 1(b), the magnet 17 can be axially magnetized as FIG. 1(c) shows. The magnet 17 includes 8 corresponding axial magnetic areas, and the polarity of one end 1711 of the magnetic area 171 is opposite to that of another end 1712 of the magnetic area 171. Specifically, each end of the magnetic areas have a polarity opposite to that of a corresponding end of an adjacent one. As FIG. 1(c) shows, the polarity of the end 1711 of the magnetic area 171 is S, while the polarity of the end 1721 of the magnetic area 172 is N. Similarly, the polarity of the end 1712 of the magnetic area 171 is N, while the polarity of the end 1722 of the magnetic area 172 is S.

If the magnet is magnetized radially, the magnetic areas will be spread as FIG. 1(*b*) shows. That is, two magnetic strips 12 and 13 exist. If the magnet is magnetized axially, the magnetic areas will be spread as FIG. 1(*c*) shows. Then only one magnetic strip 17 exists.

Figure 2A:
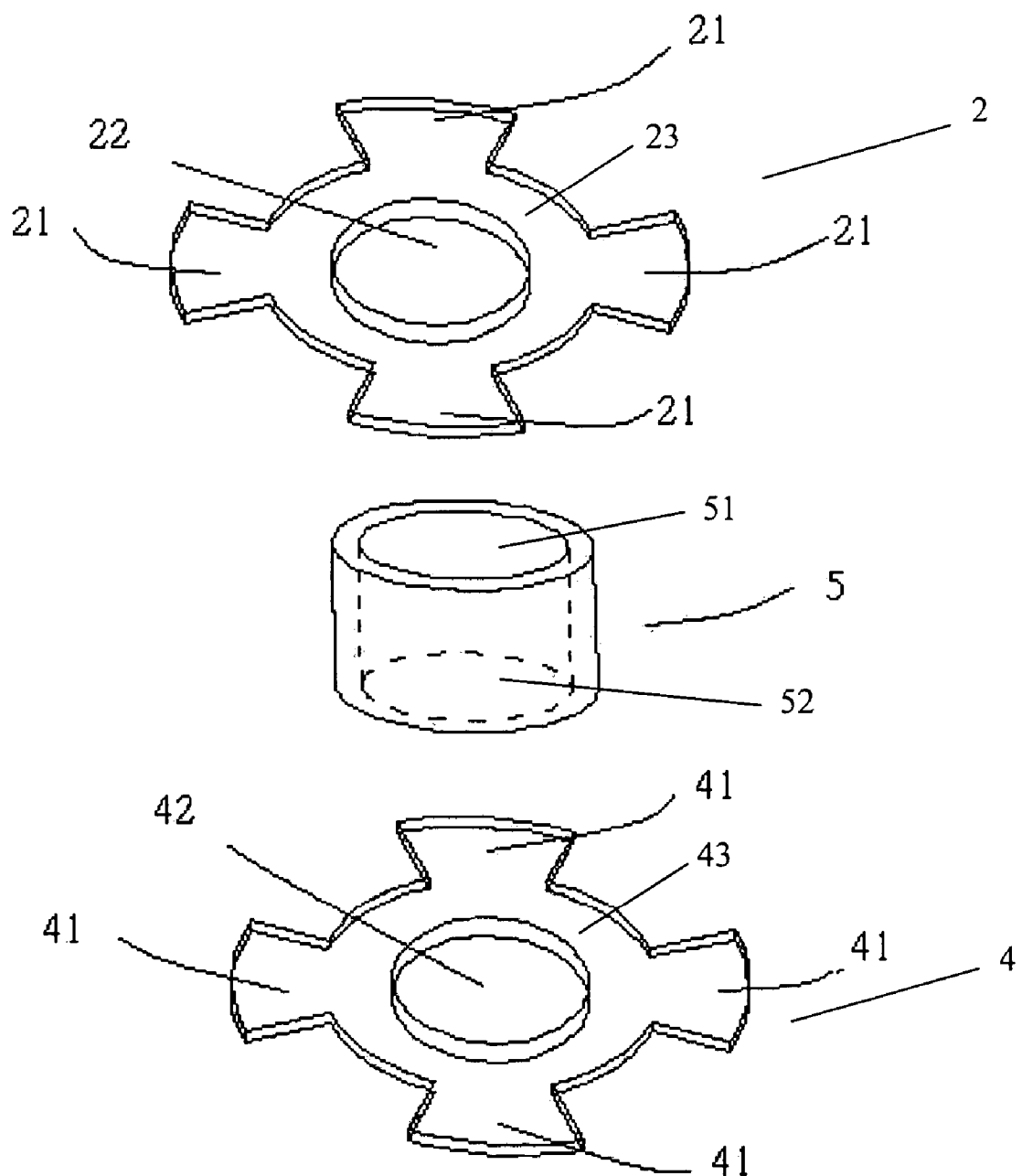
FIG. 2(a) is a diagram showing the stator structure of the non-brush D.C. motor in accordance with the first preferred embodiment of the present invention.
Figure 2B:
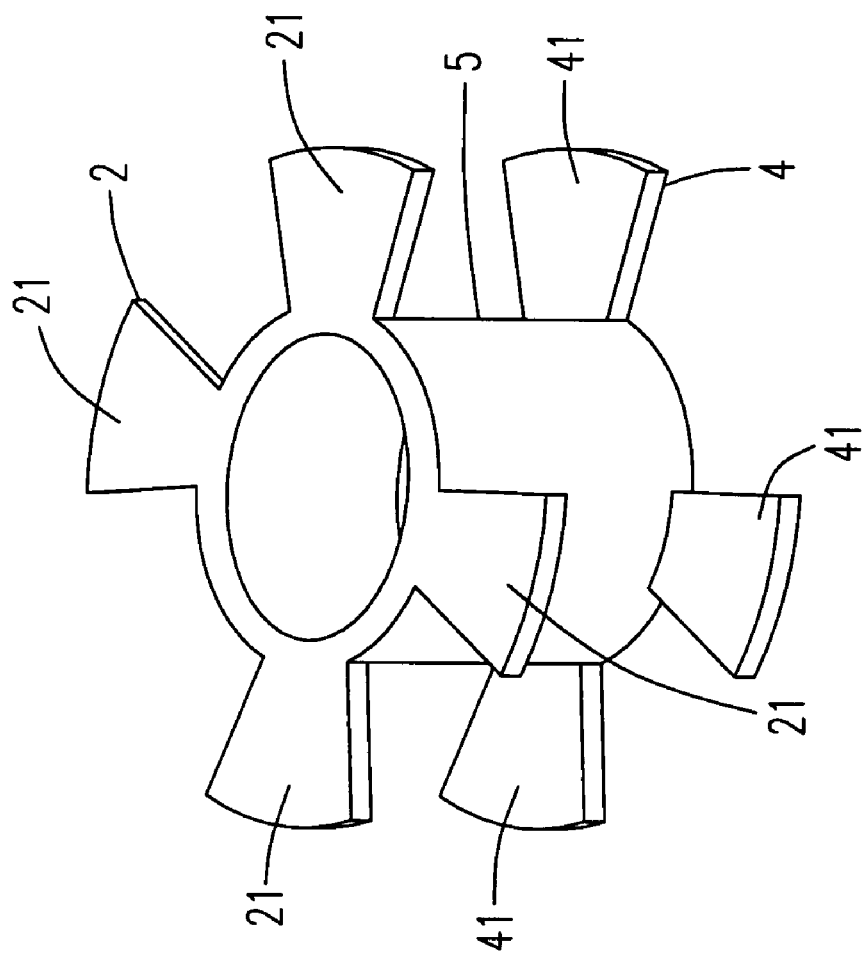
FIG. 2(b) is the side view of the stator structure according to FIG. 2(a)

Please refer to FIG. 2(*a*), which is a diagram showing the stator structure of the non-brush D.C. motor in accordance with the first preferred embodiment of the present invention. The stator structure is composed of an upper polar plate 2, a sleeve 5, and a lower polar plate 4. The upper polar plate 2 has a first ring 23 and four first salients 21. The four first salients 21 are spacedly and coplanarly extended from the first ring 23. The upper polar plate 2 is connected to the sleeve 5 by the first ring 23 and positioned on the opening 51. Similarly, The lower polar plate 4 has a second ring 43 and four second salients 41. The four second salients 41 are spacedly and coplanarly extended from the second ring 43. The lower polar plate 4 is connected to the sleeve 5 by the second ring 43 and positioned on the opening 52.

Specifically, in order to start the single-phased non-brush D.C. motor in the present invention, the salients 21 and 41 of the stator structure must be cranked toward the same direction. The details will be described below.

With reference to the material of the stator structure, the sleeve 5 is made of a magnetically conductive material. The stator structure can also be integrally formed by a magnetically conductive material, i.e. silicon steel.

FIG. 2(*b*) shows the side view of the stator structure according to FIG. 2(*a*). The position of each piece of the first salients 21 has to correspond to that of each piece of the second salients 41. Specifically, in order to improve the performance of the torque, both the upper polar plate 2 and the lower polar plate 4 can be made of more than one layer of silicon steel.

For the radially magnetized magnet 15, it is noted that the number of the magnetic areas of the upper magnetic strip 13 or the lower magnetic strip 12 is twice of the number of the first salients 21 or the second salients 41. That is, if the number of the first salients 21 or the second salients 41 is N, the number of the magnetic areas of the upper magnetic strip 13 or the lower magnetic strip 12 is 2N, wherein N is an integer greater than 1.

For the axially magnetized magnet 17, similarly, the number of the magnetic areas 171 is also twice of the number of the first salients 21 or the second salients 41. That is, if the number of the first salients 21 or the second salients 41 is N, the number of the magnetic areas 171 is 2N, wherein N is an integer greater than 1.

Figure 3:
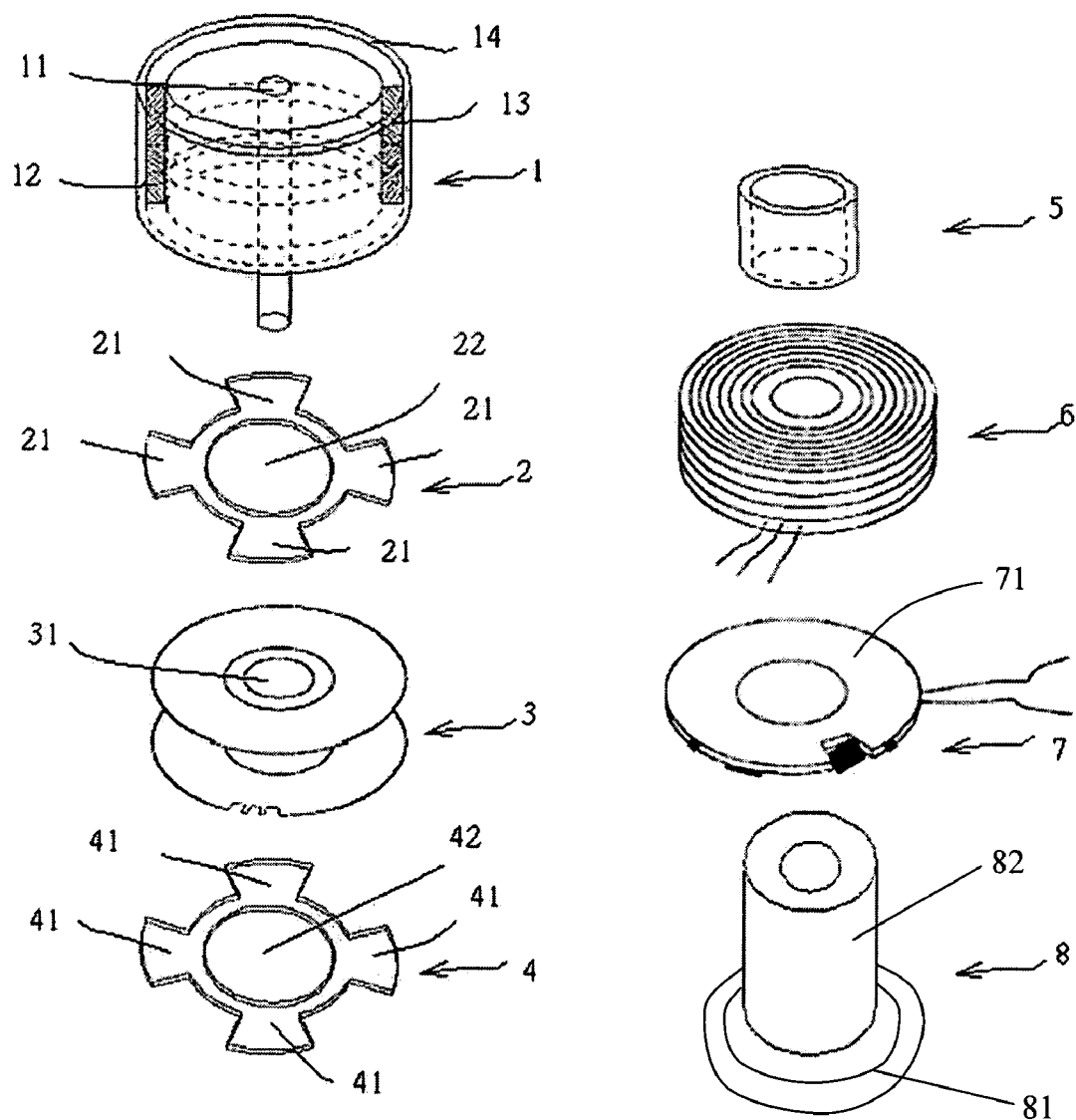
FIG. 3 is a perspective view of the non-brush D.C. motor in accordance with a preferred embodiment of the present invention.

Please refer to FIG. 3, which is a perspective view of the non-brush D.C. motor in accordance with a preferred embodiment of the present invention. For the convenience of describing, the radially magnetized magnet 15 of the rotor structure is adopted.

The non-brush D.C. motor includes the rotor structure 1, the upper polar plates 2, a insulator 3, the lower polar plates 4, the sleeve 5, a coil 6, a circuit board 7, and a stator bracket 8.

The insulator 3 wound by the coil 6 is made by plastic material. The insulator 3 is also provided with a round opening 31 for receiving therein the sleeve 5 to complete a magnetic path for rotating the rotor 1.

The upper and lower polar plates 2, 4 are provided with the openings 22, 42 for the stator bracket 8 to pass through. The upper polar plate 2 and the lower polar plate 4 have no polar difference, in other words, they are aligned to each other axially. The stator bracket 8 made of a non-magnetically conductive material includes a support 81 and a cylinder 82. The insulator 3 is sheathed on the first salients 21 and the second salients 41 and the sleeve 5 for prohibiting the contact of the coil 6 with the stator structure. The stator bracket 8 with the cylinder 82 protrudes, passes through, and supports the hollow of the circuit board 7, the opening 42, the sleeve 5 and the insulator 3, and the opening 22. The cylinder 82 finally receives the rotation axis 11. The circuit board 7 further includes an electric circuit 71 for detecting and controlling a magnetic field generated by the stator structure.

Figure 4:
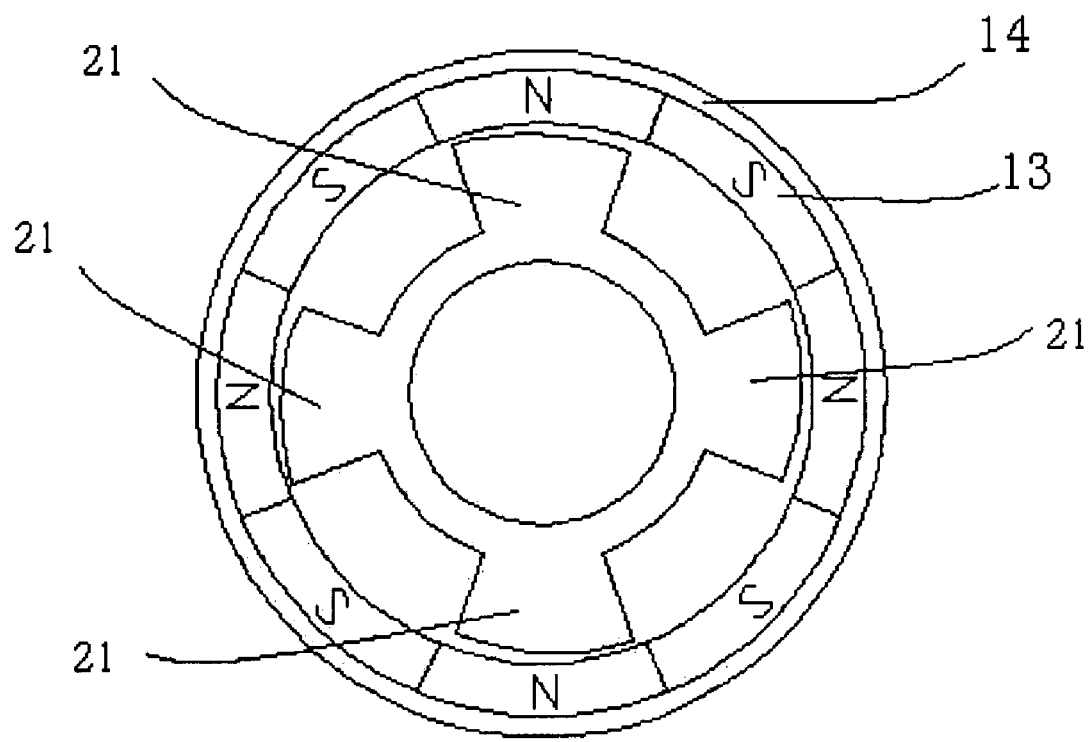
FIG. 4 is the top view of the polar plates and the magnets of the non-brush D.C. motor in accordance with a preferred embodiment of the present invention.

FIG. 4 shows the top view of the polar plates and the magnets of the non-brush D.C. motor in accordance with a preferred embodiment of the present invention. Between the upper polar plate 2 and the upper magnet strip 13 is the air gap. The four first salients 21 of the upper polar plate 2 are positioned toward the same polarity of the magnet strip 13. As aforementioned, the four first salients 21 of the upper polar plate 2 and the four second salients 41 of the lower polar plate 4 must be cranked toward the same direction. The cranked salients 21 and 41 lead to the asymmetry of the air gap under every salient and then make a uneven air, which is the key to start the single-phased D.C. motor.

Figure 5A:
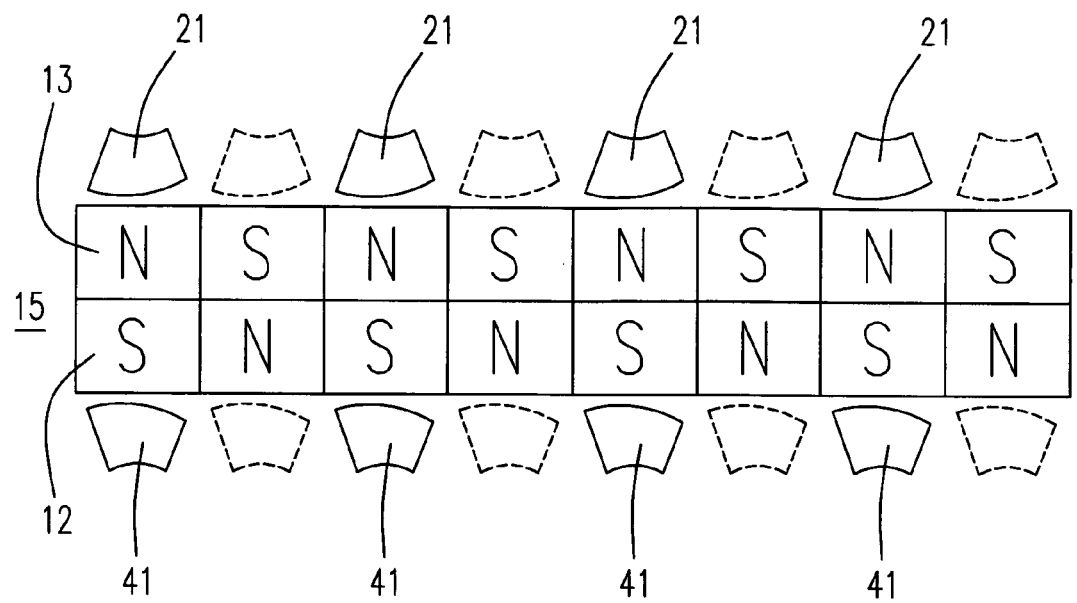
FIGS. 5(a) & 5(b) show the corresponding positions of the radially magnetized magnets and the polar plates cranked toward different directions in accordance with a preferred embodiment of the present invention.
Figure 5B:
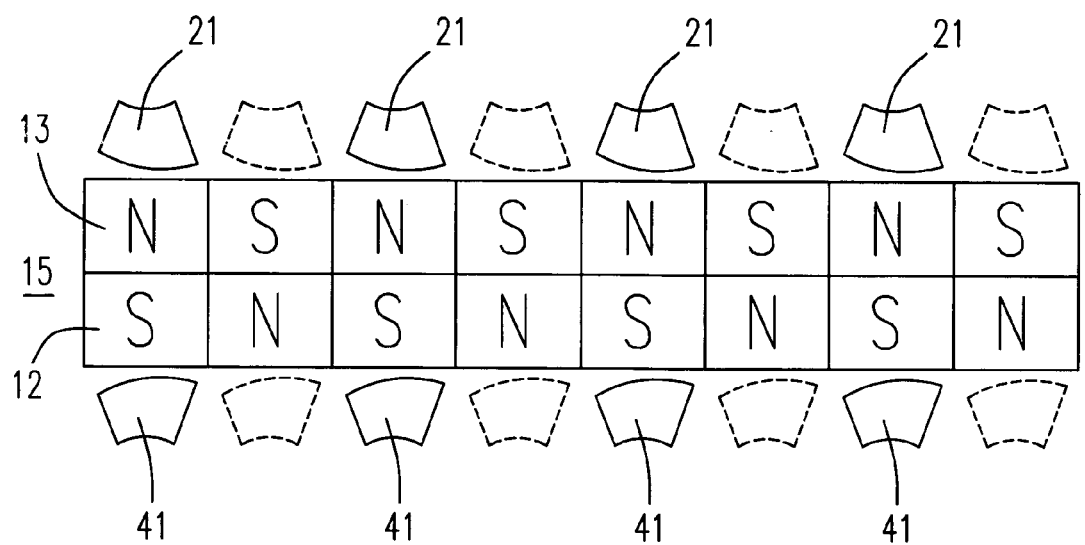

FIGS. 5(*a*) & 5(*b*) show the corresponding positions of the radially magnetized magnets and the polar plates cranked toward different directions in accordance with a preferred embodiment of the present invention. As FIG. 5(*a*) shows, the salients 21 and 41 are cranked toward one direction. The salients 21 and 41 are cranked toward the other direction in FIG. 5(*b*).

When the stator structure is energized through electrifying the coil 6, each piece of the salients 21 is induced to have a polarity opposite to each corresponding piece of the salients 41. That is, if the polarity of the salients 21 of the upper polar plate 2 after energized becomes N, the salients 41 of the lower polar plate 4 becomes S. Then the rotor 1 will be moved to the right to face the next pole by the magnetic field. By reversing the current of the coil 6, the polarity of the salients 21 and 41 will interchange; that is, the polarity of the salients 21 becomes S, and the salients 41 becomes N. Then the rotor 1 will continue to be moved to the right and so on to complete the rotation movement around the rotation axis 11.

Figure 6A:
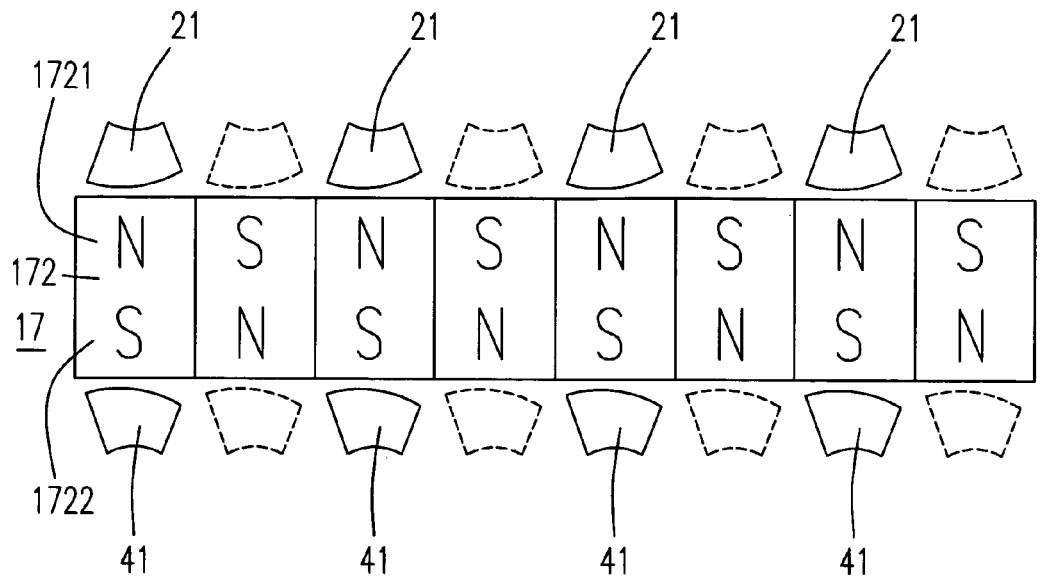
FIGS. 6(b) & 6(b) show the corresponding positions of the axially magnetized magnets and the polar plates cranked toward different directions in accordance with a preferred embodiment of the present invention.
Figure 6B:
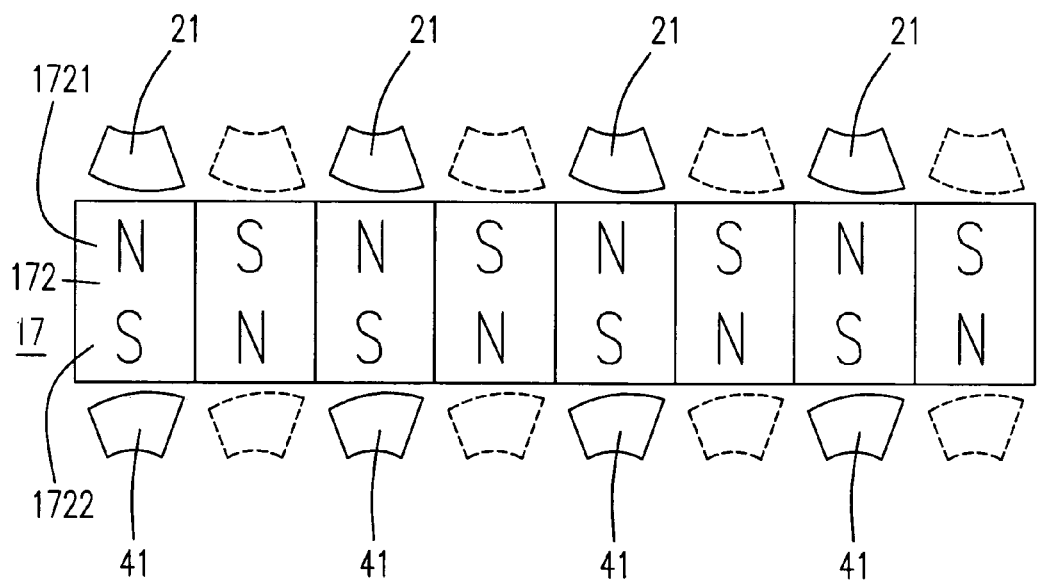

FIGS. 6(*a*) & 6(*b*) show the corresponding positions of the axially magnetized magnets and the polar plates cranked toward different directions in accordance with a preferred embodiment of the present invention. As FIG. 6(*a*) shows, the salients 21 and 41 are cranked toward one direction. The salients 21 and 41 are cranked toward the other direction in FIG. 6(*b*).

The material of the housing in FIG. 5 must be a magnetically conductive material, but the material of the housing in FIG. 6 is not be limited to the magnetically conductive material, which means copper is a good choice. One skilled in the art can induce that it can decrease the needed quantity of the magnetic materials by employing the axially magnetized magnets.

Figure 7A:
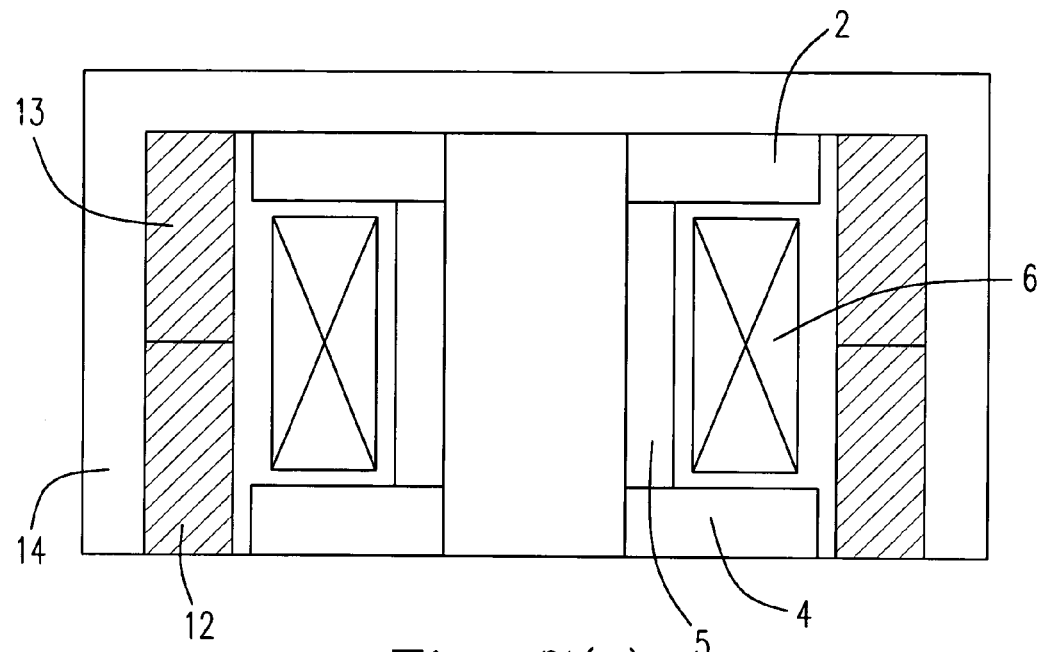
FIG. 7(a) is a cross sectional view of the non-brush D.C. motor according to FIGS. 5(a) & 5(b)
Figure 7B:
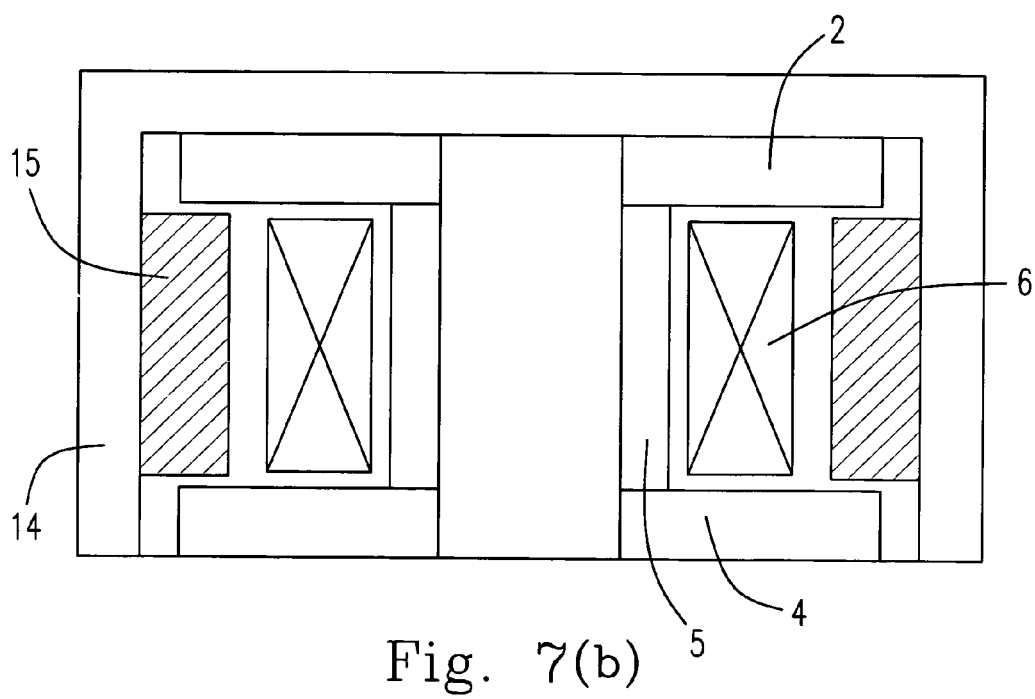
FIG. 7(b) is a cross sectional view of the non-brush D.C. motor according to FIGS. 6(a) & 6(b)

FIG. 7(*a*) and FIG. 7(*b*) are the cross sectional views of the non-brush D.C. motor according to FIG. 5 and FIG. 6 respectively. As FIG. 7(*a*) shows, the upper and lower magnet strip 13, 12 (Nevertheless, in FIG. 7(*b*) is the single magnet strip 17) complete a magnetic path with the upper polar plate 2, the sleeve 5 and the lower polar plate 4 with the magnetic field generated by the electrified coil 6.

Figure 8:
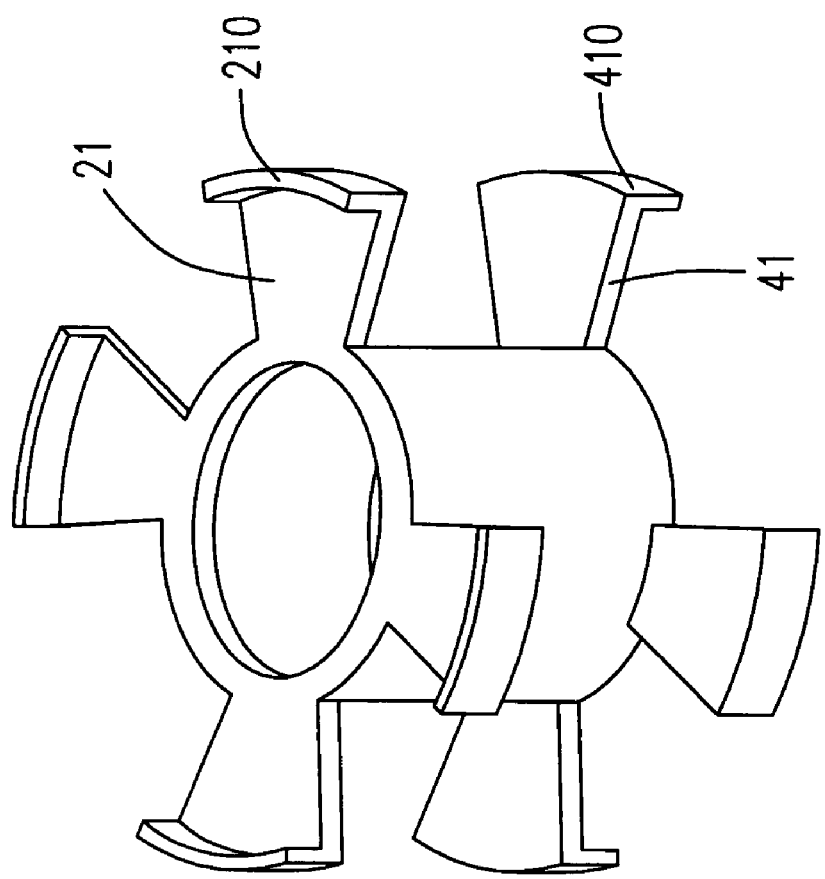
FIG. 8 is a diagram showing the stator structure of the non-brush D.C. motor in accordance with the second preferred embodiment of the present invention.
Figure 9:
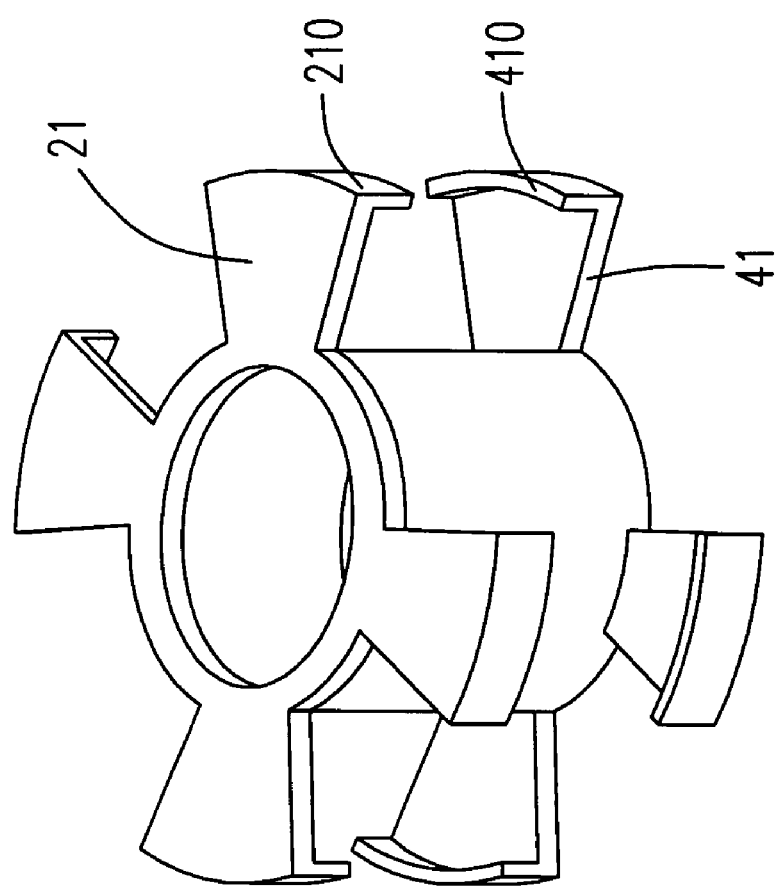
FIG. 9 is a diagram showing the stator structure of the non-brush D.C. motor in accordance with the third preferred embodiment of the present invention.

It is to be mentioned that, the salients 21 and 41 can also be bended to form the extended salients 210 and 410 as showed in FIG. 8 and FIG. 9. As such, the performance of the torque of the stator structure is improved.

Although this invention has taken a single-phased non-brush D.C. motor as an instance, no doubt it can also be utilized in the application of a multiple-phased structure. The non-brush D.C. motor in accordance with this invention is more compact than the prior art mentioned formerly, and is fit for the application of the low profile motor or the miniature motor.

The present invention has the different stator and rotor structure from the conventional motors. Firstly, the present stator structure has only two magnetic strips which are aligned to each other axially and hence have no polar difference. Comparing to the prior art provided formerly, the motor with the present stator structure can be implemented in smaller size. Secondly, corresponding to the improved stator structure, the present rotor structure is magnetized in two different ways, which results in the arrangement of the new type of the magnetized areas. With the existence of the new type of the magnetized areas, the present rotor structure provides a more efficient operation to the motor. To sum up, the motor with the present rotor and stator structure has a more compact volume and is able to operate much more efficiently.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A motor comprising:
    a rotor structure comprising a rotation axis and a magnet encircling said rotation axis, wherein said magnet comprises two parts separated by a plane perpendicular to said rotation axis, each part comprises 2N corresponding magnetic areas, each said magnetic area has a polarity opposite to that of an adjacent one and said magnetic areas which are vertically corresponding to each other have opposite polarities;
    a stator structure comprising a sleeve, a first ring positioned on one opening of said sleeve, and a second ring positioned on the other opening of said sleeve, wherein N pieces of first salients and N pieces of second salients are spacedly and coplanarly extended from said first ring and said second ring respectively, and the position of each piece of said first salients corresponds to that of each piece of said second salients; and
    a coil wound around said sleeve;
    wherein when said stator structure is energized through electrifying said coil, each piece of said first salient is induced to have a polarity opposite to each corresponding piece of said second salient, so that said rotor structure rotates around said rotation axis, and N is an integer greater than 1.

2. The motor according to claim 1, wherein said sleeve is made of a magnetically conductive material.

3. The motor according to claim 1, wherein said first salients and said second salients are cranked toward the same direction.

4. The motor according to claim 1, wherein said first ring and said first salients serve as an upper polar plate, said second ring and said second salients serve as a lower polar plate, and said upper polar plate and said lower polar plate are both made of M layers of silicon steel, wherein M is a nature integral.

5. The motor according to claim 1, wherein said stator structure is integrally formed by a magnetically conductive material.

6. The motor according to claim 5, wherein said magnetically conductive material is silicon steel.

7. A motor comprising:
    a rotor structure comprising a rotation axis and a magnet encircling said rotation axis, wherein said magnet comprises 2N corresponding axial magnetic areas, one end of each said magnetic area has a polarity opposite to that of another end of said magnetic area and each end of said magnetic areas has a polarity opposite to that of a corresponding end of an adjacent one;
    a stator structure comprising a sleeve, a first ring positioned on one opening of said sleeve, and a second ring positioned on the other opening of said sleeve, wherein N pieces of first salients and N pieces of second salients are spacedly and coplanarly extended from said first ring and said second ring respectively, and the position of each piece of said first salients corresponds to that of each piece of said second salients; and
    a coil wound around said sleeve;
    wherein when said stator structure is energized through electrifying said coil, each piece of said first salient is induced to have a polarity opposite to each corresponding piece of said second salient, so that said rotor structure rotates around said rotation axis, and N is an integer greater than 1.

8. The motor according to claim 7, wherein said sleeve is made of a magnetically conductive material.

9. The motor according to claim 7, wherein said first salients and said second salients are cranked toward the same direction.

10. The motor according to claim 7, wherein said first ring and said first salients serve as an upper polar plate, said second ring and said second salients serve as a lower polar plate, and said upper polar plate and said lower polar plate are both made of M layers of silicon steel, wherein M is a nature integral.

11. The motor according to claim 7, wherein said stator structure is integrally formed by a magnetically conductive material.

12. The motor according to claim 11, wherein said magnetically conductive material is silicon steel.

13. The motor according to claim 1, wherein at least one side of each said magnetic area is facing said rotation axis.

14. The motor according to claim 7, wherein at least one side of each said magnetic area is facing said rotation axis.

* * * * *